United States Patent Office 3,614,913
Patented Oct. 26, 1971

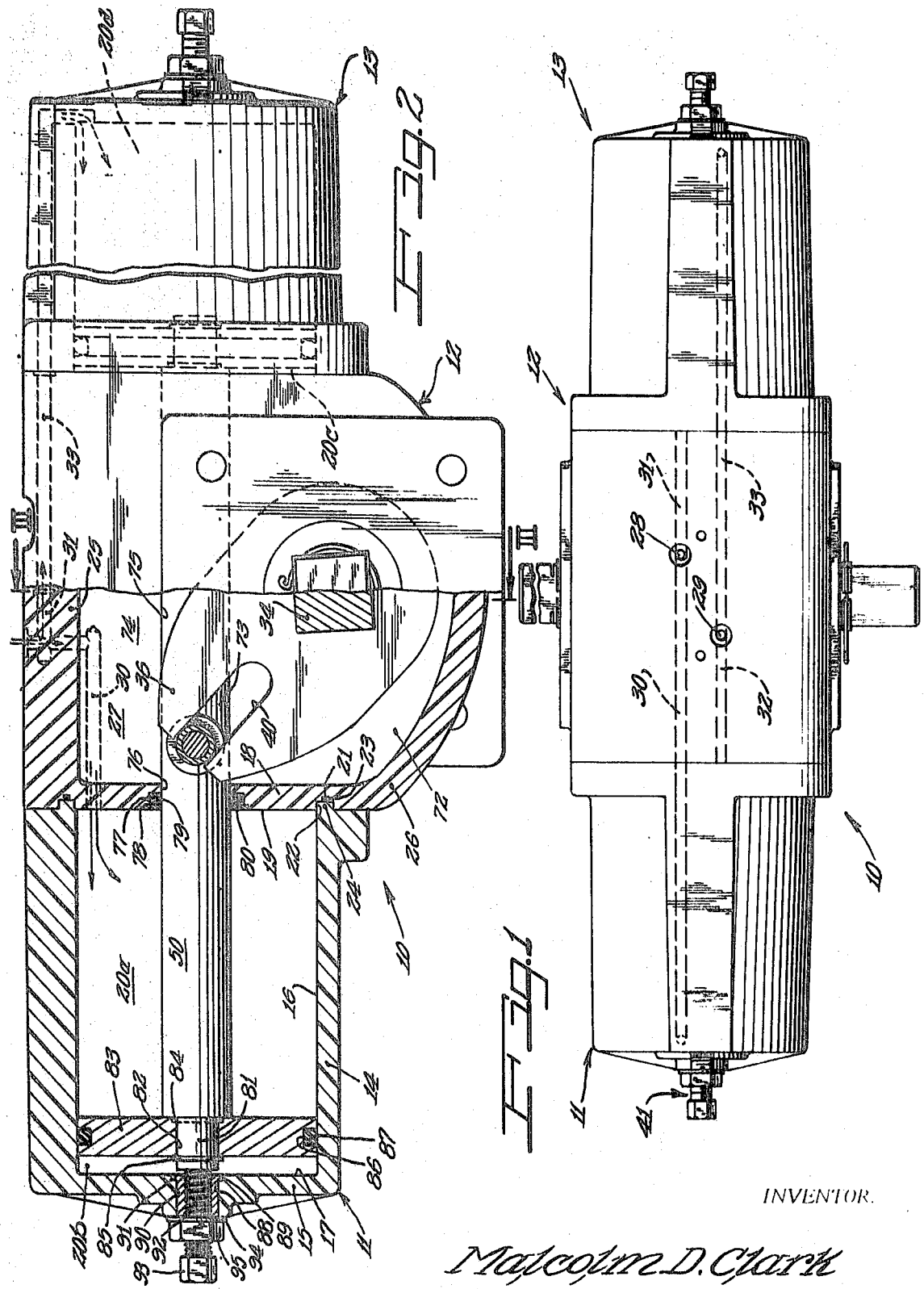

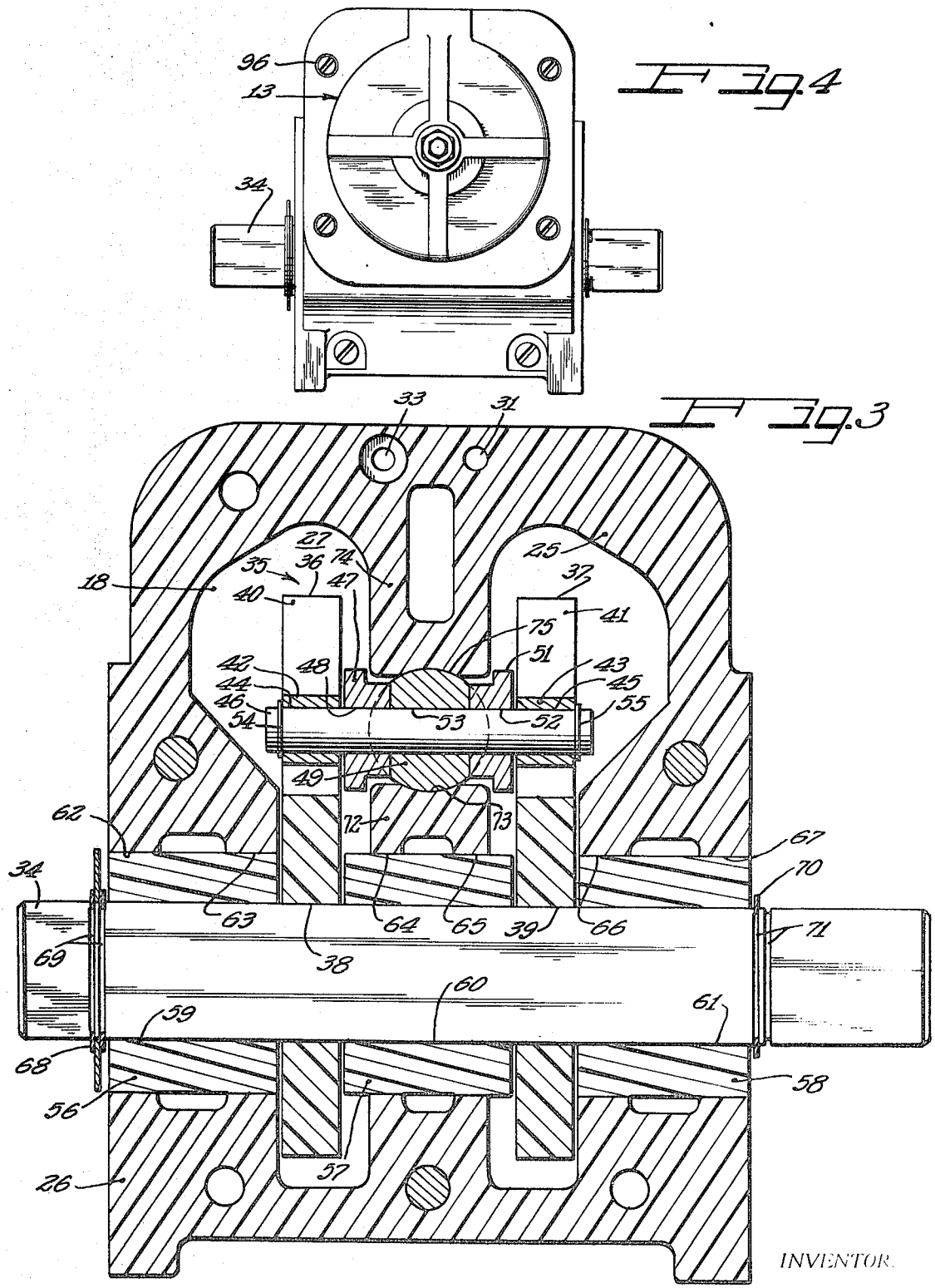

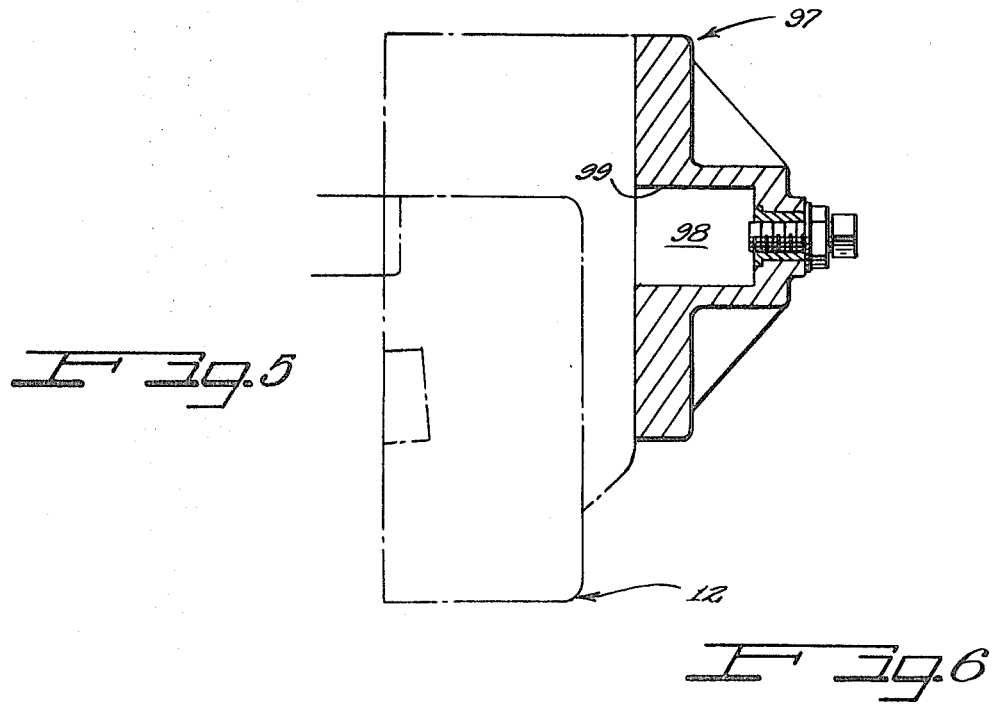
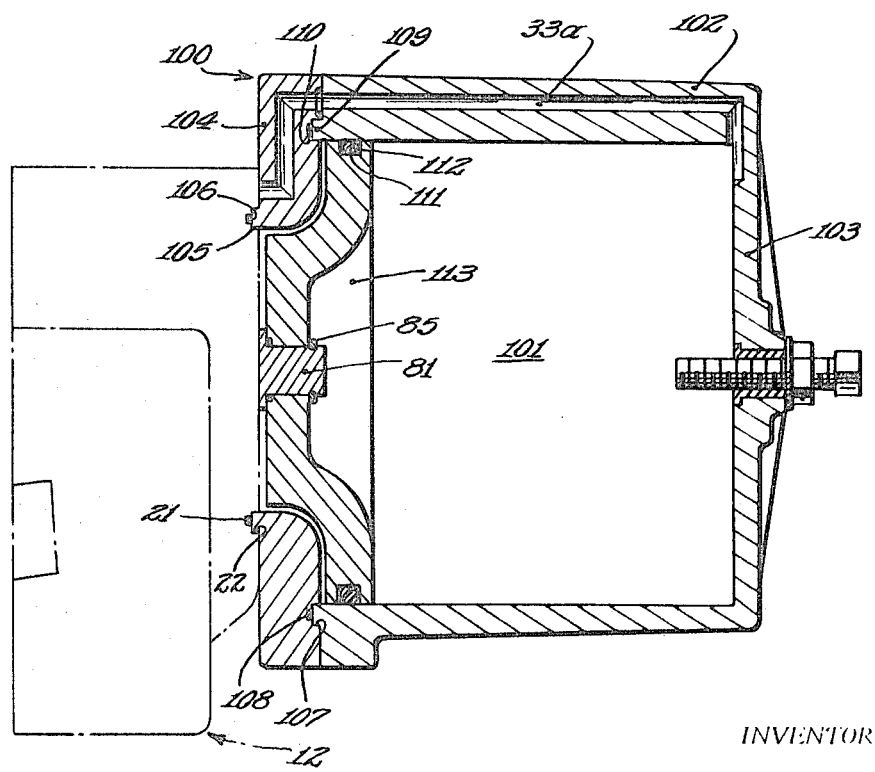

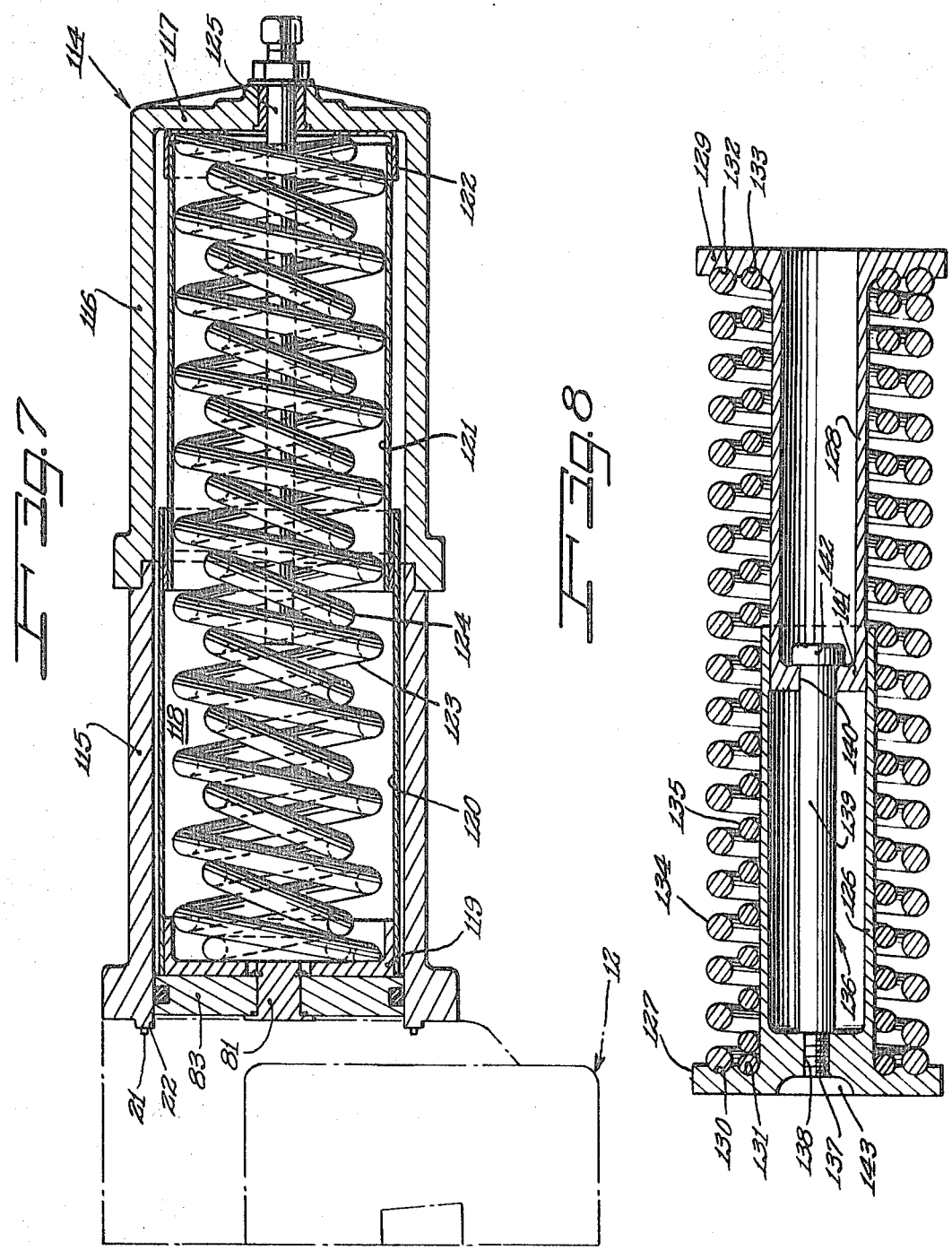

3,614,913
PNEUMATIC OPERATING MEANS FOR A VALVE
Malcolm D. Clark, Glasgow, Scotland, assignor to
Raymond Control Systems, Inc.
Filed Apr. 11, 1969, Ser. No. 815,410
Int. Cl. F01b 7/00
U.S. Cl. 92—138                                      14 Claims

ABSTRACT OF THE DISCLOSURE

A pneumatically operated valve actuator employs a centrally located piston rod which is slidably supported over a substantial length of its travel by upper and lower guiding rails or tracks and which is movable in response to the receipt of fluid operating pressures which are directed simultaneously through two branches of a fluid circuit internally of the actuator and against the faces of a pair of oppositely disposed pistons carried by the piston rod so that the branch fluid circuits cooperably power the actuator. Total piston areas may be varied by changing or eliminating cylinders. Additionally, the actuator may be employed for placing its corresponding controlled valve in a desired fully open or fully closed position in response to an alarm condition by a biasing arrangement having spring means which is loaded by operation of the actuator. The actuator is preferably constructed primarily of plastic components to minimize friction and provide for ease in formation of the fluid circuits therein.

BACKGROUND OF THE INVENTION

Field of the invention

This invention relates to fluid operated means for actuating circuit controlling apparatus, and more particularly, to a pneumatic actuator for operating valves which require rotation of their stems to be operated between fully open conditions and fully closed conditions.

Description of the prior art

It is generally known in the art to provide pneumatic or hydraulic actuators for operating valves or similar devices which require rotation of an operating member, such rotation providing for a fully open condition or a fully closed condition within an approximately 90° turn of the operating member. Generally, such actuators have been quite expensive in that although the initial manufacturing cost is not in itself particularly high, the operating and maintenance cost become excessive due to a great amount of friction existing between actuator members which are movable relative to one another. The frictional forces cause an increase in the required operating pressures for the actuator and cause premature wearing between the actuator parts. Therefore, a greater design effort of increased cost is required for providing such actuators. Furthermore, actuators which employ a pair of oppositely disposed pistons on the same shaft for increasing the force which may be supplied to a valve stem require that a fluid circuit be provided to the respective cylinders of the oppositely disposed pistons, the fluid circuits being directed to each piston in such a manner that the result force against each piston is cooperable with the force against the other piston. In such arrangements, the provision of such fluid circuits have heretofore resided in the connection of a plurality of fluid conduits to each side of the cylinders which house each piston. Accordingly, it is therefore required that such actuators be provided with a plurality of fluid inlets and the corresponding fluid conduits for each cylinder. It is therefore desirable to provide a fluid operated actuator which is free of the above-mentioned frictional and design disadvantages and which may be provided by a simple construction having low frictional forces between its moving parts so that operation and maintenance are relatively inexpensive and in which the fluid circuits require a minimum number of fluid inlets to simplify installation and maintenance of the actuator.

SUMMARY OF THE INVENTION

According to the invention, a pneumatic actuator is provided with a centrally located piston rod that is slidably supported in a track system which is a portion of a molded plastic housing, the plastic having a low coefficient of friction such that the piston rod-track system may be considered as a self-lubricating assembly. The piston rod is coupled to an output shaft which in turn is secured in plastic bearings which are in turn journalled to the plastic housing in a manner which also provides for a self-lubricating relationship. Therefore, the movable parts of the actuator are substantially free of frictional losses and wear. The actuator may be pneumatically and mechanically symmetrical about the linkage between the piston rod and the output shaft wherein two pistons are operatively supported by the shaft and each piston receives cooperating fluid pressures for rotating the output shaft in either direction. Heretofore, actuators of this general description required a plurality of fluid inlets to each piston chamber for providing the cooperative fluid pressures to move both pistons. Such prior actuators accordingly, required a plurality of fluid conduits for connecting two sources of operating pressure. Contrary to this general design, the present invention provides for a minimum number of fluid conduits, while at the same time maintaining the necessary number of fluid circuits for providing cooperable operation of the pistons by including such fluid circuits as passageways formed within the housing walls of the actuator. Such fluid circuits may be formed in the housing by drilling however, inasmuch as the actuator of the present invention may advantageously be made of a plastic material, molding of passageways within the walls of the housing is the preferred method of providing such fluid circuit.

BRIEF DESCRIPTION OF THE DRAWINGS

The invention, its organization, construction and operation will be best understood by referring to the following description taken in conjunction with the accompanying drawings, in which:

FIG. 1 is a top plan view of an embodiment of a pneumatic actuator constructed in accordance with the principles of the present invention;

FIG. 2 is a front elevational view, shown partially fragmented, of the pneumatic actuator illustrated in FIG. 1, the parting line being taken on the viewing side of the track system;

FIG. 3 is a sectional view of the actuator taken along the line III—III of FIG. 2;

FIG. 4 is an end elevational view of the actuator as viewed relative to FIG. 2; and FIGS. 5–8 are sectional elevational views of modifications of the embodiment of the invention illustrated in FIGS. 1–4.

DESCRIPTION OF THE PREFERRED EMBODIMENT

In FIGS. 1–4 of the drawings a pneumatic actuator is shown generally at 10 as comprising three major housing components, a first piston cylinder housing 11, a central linkage housing 12 and a second piston cylinder housing 13. The housings 11, 12 and 13 are preferably molded from a thermoplastic material which has a low coefficient of friction. Inasmuch as housings 11 and 13 are symmetrical, only one of these housings, housing 11, will be discussed in detail herein, housing 13 being understood to be identical but of a reverse orientation.

Housing 11 comprises a cylindrical wall 14 and an end wall 15 having inner surfaces 16 and 17, respectively, which with inner surface 19 of wall 18 of the linkage housing 12 form a piston cylinder or chamber 20a, 20b. Housing wall 18 includes a pair of annular grooves 21 and 22 which receive an O-ring 23 and an end projection 22 of housing wall 14, respectively. A plurality of machine screws 96 are employed to secure the housings 11 and 12 in a fluid-sealed relationship in which O-ring 23 is placed in a compressed condition.

Housing 12 includes walls 18, 25, 26 and other walls (not shown) having inner surfaces which form a chamber 27 for housing the mechanical linkages of the actuator. Formed in walls 14 and 25 of the housings 11 and 12, respectively, are a plurality of fluid circuits including two fluid inlets 28 and 29. The fluid circuit associated with inlet 28 comprises branch circuits 30 and 31 which extend to chambers 20b and 20c, respectively, and the fluid circuit associated with inlet 29 includes branch circuits 32 and 33 which extend to chambers 20a and 20d, respectively. Fluid pressures for cooperably operating the pistons 83 in each of the cylinder housings 11 and 13 are applied to the respective chambers of these housings by way of the branch circuits within the housings 11, 12 and 13, after receipt thereof at the two inlets 28 and 29. The provision of the fluid circuits within the housings of the actuator, by machining or molding, minimizes the number of connections and the number of fluid conduits necessary to achieve to cooperable displacement of the pistons.

A mechanical linkage assembly 35 is mounted in housing chamber 27 for translating the linear reciprocal motion of the pistons into a corresponding rotational reciprocal motion for turning a valve stem at output shaft 34. The linkage assembly 35 comprises a pair of yokes 36 and 37 having rectangular apertures 38 and 39 therethrough respectively. Output shaft 34 has corresponding rectangular cross-section and extends through apertures 38 and 39. Yokes 36 and 37 also include U-shaped surfaces 40 and 41, respectively, for receiving bearings 42 and 43 in operative engagement therewith. Bearings 42 and 43 include respective bores 44 and 45 therethrough for receiving a shaft 46. A spacer 47 having a bore 48 for receiving shaft 46 is positioned between yoke 36 and a machined section 49 of piston rod 50. A like spacer 51 having a bore 52 is placed between portion 49 of piston rod 50 and yoke 37. Piston rod 50 also includes a bore 53 for receiving shaft 46, the linkage assembly being secured by a pair of locking rings 54 and 55 at each end of shaft 46.

The linkage assembly 35 and the output shaft 34 are rotatably mounted within housing 12 by a plurality of plastic bearings 56, 57 and 58 having respective rectangular bores 59, 60 and 61 therethrough which conform to the size and shape of rectangular output shaft 34. The plastic bearings 56, 57 and 58 are disposed within a circular bore of housing 12 which is formed by the molded annular surfaces 62, 63, 64, 65, 66 and 67. A retaining ring 68 is located in grooves 69 at one end of output shaft 34 and a like retaining ring 70 is located in grooves 71 at the other end of output shaft 34 to secure shaft 34.

The linkage assembly illustrated herein will provide a rotation of output shaft 34 of less than 180°; however, a modification of this assembly to provide a geared coupling, for example a rack and pinion coupling, between the piston rod and the output shaft may increase output rotation to any number of degrees depending on the length of travel of the piston rod.

Formed within housing 12 are a pair of tracks for supporting and guiding piston rod 50 in a relatively friction-free relation over a distance which is substantially the length of its operational travel. These tracks include a lower track 72 having a curved guide surface 73 and an upper track 74 having a curved guide surface 75. As piston rod 50 is caused to reciprocate back and forth in chambers 20 and 27, it is supported and guided by tracks 72 and 74 over approximately one half of its length and substantially the entire distance of its travel.

The back and forth movement of piston rod 50 causing bearings 42 and 43 to engage surfaces 40 and 41 of yokes 36 and 37 to rotatably displace yokes 36 and 37 and accordingly rotate output shaft 34. The support and guidance provided by the track system maintains the piston rod 50 movable in a straight line so that no radial forces are developed to cause deflections of rod 50 or on piston 83.

Piston rod 50 extends through wall 18 by way of a counterbored hole having bore sections 76, 77 and 78. An annular seal 79 is disposed in bore section 77 and secured therein by a seal retainer 80 which is disposed in locking engagement with bore section 78 to provide a fluid-sealed relationship between chamber 20a and chamber 27.

Piston rod 50 includes a stepped end section 81 of smaller diameter which extends through a counterbored hole 82 of piston 83. Hole 82 includes a groove which receives an O-ring 84 therein. A retaining ring 85 secures piston 83 to section 81. Piston 83 has an annular groove 86 about its circular outer surface in which an O-ring 87 is located to provide a slidable fluid seal between chamber 20a and chamber 20b.

End wall 15 includes a counterbored aperture 88 having a bore section 89 for receiving annular ridge 91 of plug 90. Plug 90 has a threaded bore 92 which receives a threaded bolt 93 therethrough. A fiber sealing washer 94 and a nut 95 are carried by bolt 93. By means of the bolt 93, nut 95 and threaded plug 90, the actuator is provided with means for adjustably limiting the travel of piston rod 50. A similar arrangement of parts is located at the end of housing 13. The travel of piston rod 50 may therefore be adjusted so that the two extreme conditions of the controlled element connected to the output shaft 34 may be accurately determined.

FIGS. 5-8 illustrate attachments which modify the embodiment of the invention of FIGS. 1-4. In FIG. 5 an end cap 97 may replace housing 13 when the actuator is employed with a controlled element which does not require the energy for operation that is supplied by the second piston. With end cap 97 in place the piston associated with that end of the actuator would of course be removed from the piston rod. A chamber 98 is formed by walls 99 to receive the corresponding end of the piston rod. The end cap 97 is also provided with means for adjustably limiting the travel of the piston rod.

To increase the energy delivered to output shaft 34, the apparatus 100 of FIG. 6 may be connected to housing 12. Apparatus 100 comprises a piston chamber 101 formed by a cylindrical wall 102, and an end wall 103 and an adapter plate 104. Grooves 21 and 22 of housing 12 receive a ridge 105 and an O-ring for sealing housing 12 and adapter 104 in a fluid-sealed relation. Grooves 107 and 108 receive ridge 109 and an O-ring 110 for placing adapter 104 and wall 102 in a fluid seal relation. A piston 113 is secured to end 81 of rod 50 by retaining ring 85 as previously discussed; however, piston 113 is much larger than piston 83 and will therefore transmit a greater output force to shaft 34 under the same pressure conditions. Piston 113 has an annular groove 111 therein which receives an O-ring 112 for a sliding fluid-sealed engagement with the inner surface of cylindrical wall 102. A fluid passageway 33a is formed in an adapter 104 and wall 102 for carrying fluid pressure from inlet 29 to the far end of chamber 101. Another fluid passageway (not shown) connects fluid inlet 28 with chamber 101 for transmitting fluid pressure to move piston 113 toward the right as viewed in the drawing. Adjustable limiting means are also provided in end wall 103 for accurately controlling one extreme piston position for one of the extreme conditions of the controlled element.

For actuators which are to be employed in situations wherein an alarm condition requires that the controlled element be placed in particular one of its extreme conditions, either fully opened or fully closed, the apparatus 114 of FIG. 7 may be employed. Apparatus 114 comprises hollow cylindrical wall members 115 and 116 which, with a wall of housing 12 and end wall 117 form a chamber 118. Positioned within chamber 118 are telescopically related cylindrical elements 120 and 121 which are affixed to their respective end caps 119 and 122 to form a spring housing. Springs 123 and 124 are located within the spring housing so formed and there against end caps 119 and 122. The adjustable limiting means includes, in this instance, an elongate bolt 125 which extends along the axes of springs 123 and 124 to reach the end of the piston rod when the rod is fully extended toward end wall 117. Movement of piston 83 toward end wall 117 causes cylindrical element 121 to be telescopically received by cylindrical element 120 and springs 123 and 124 accordingly place a restoring force against end cap 119 and piston 83. In the event of an alarm condition wherein piston 83 is required to travel away from end wall 117, the removal of fluid power from the actuator permits springs 123 and 124 to force piston 83 in a direction away from end wall 117 to either fully open or fully close the controlled device.

The apparatus of FIG. 8 is a modification of the apparatus of FIG. 7, housing elements 115 and 116 not being shown. In this arrangement a generally cylindrical hollow element 126 telescopically receives another generally cylindrical hollow element 128. Element 126 has an annular flange 127 for bearing against piston 83 and element 128 includes an annular flange 129 for bearing against end wall 117. A plurality of grooves 130, 131, 132 and 133 locate springs 134 and 135 against the flanges 127 and 129. An elongate bolt 136 includes a threaded end 136 which is engaged by the threaded bore 138 of flange 127. Bolt 136 also includes an elongate portion 139 which extends through bore 140 of end 141 of element 128 and includes a head 142 which acts as a stop against which end 141 bears when springs 134 and 135 are fully extended and against which a bolt (e.g. bolt 93) of an adjustable limiting means may strike.

In more general terms there has been described a fluid controlled actuator which employs a track system over substantially the entire length of piston rod travel for guiding the rod in such a manner that radial deflections caused by mechanical linkages thereto, are substantially eliminated. Further it has been illustrated that the number of fluid conduits external of the actuator, in the case of oppositely disposed and cooperably working pistons, may be provided by a minimum number of fluid inlets and that the extension of operating pressure to such an actuator may be handled by a minimum number of fluid conduits, that is by one fluid conduit for each direction of piston travel. Apparatus has also been shown and described wherein increased or decreased output power may be delivered to the output shaft in accordance with total piston rear. Additionally, an actuator for operation in response to alarm conditions has been described and illustrated for fully opening or closing a valve by spring action upon removal of fluid pressure.

Although I have described my invention by reference to a specific illustrative embodiment and modifications thereof, many other changes and modifications will become apparent to those skilled in the art without departing from the spirit and scope of my invention as set forth in the appended claims.

What I claim as my invention is:

1. An acuating device comprising:
   a housing including wall means defining a first elongate chamber and means defining a second elongate chamber;
   a first piston slidably disposed in said first chamber;
   a second piston slidably disposed in said second chamber;
   means for providing fluid under pressure to each end of said first and second chambers including first and second fluid inlets, a first plurality of fluid passageways formed in the wall means of said housing connecting said first fluid inlet with one end of each chamber, and a second plurality of fluid passageways formed in the wall means of said housing connecting said second fluid inlet with the other end of each chamber;
   a rod disposed within and longitudinally of said housing and connected to said first and second pistons;
   a rod guide within said housing for supporting said rod including a plurality of guide rails which define a path of travel for said rod; and
   output means extending through said housing and connected to said rod for delivering movements of said pistons to the exterior of said device.

2. The actuating device according to claim 1, wherein said plurality of guide rails are formed as integral parts of said housing.

3. The actuating device according to claim 1, wherein said rod has circular cross-section and wherein each of said guide rails includes a curved surface which conforms to the cross-section of said rod.

4. The actuating device according to claim 1, wherein said guide rails extend in supporting relation to said rod over substantially the maximum distance of rod travel.

5. The actuating device according to claim 1, wherein said guide rails includes first and second guide rails formed as integral parts of said housing and each include a trough-shaped surface which conforms to the cross-sectional shape of said rod.

6. The actuating device according to claim 1, wherein said housing includes means connecting said second chamber in fluid sealed relation to said first chamber, said plurality of guide rails extending into said first chamber and second chamber, and said rod extending into both chambers.

7. The actuating device according to claim 1, wherein said guide rails are approximately one-half the length of said rod.

8. The actuating device according to claim 1, comprising means for biasing said rod toward a first position, said biasing means comprising wall means in said housing defining a third chamber, said rod extending into and movable into said third chamber, a plurality of telescopically related elements disposed within said third chamber between said wall means and said rod, and spring means disposed within said third chamber and bearing on said telescopically related elements, whereupon movement of said rod into said third chamber loads said spring means.

9. The actuating device according to claim 8, wherein said telescopically related elements form spring retaining apparatus which includes a first tubular element including a first open end and a first closed end, and a second tubular element including a second open end and a second closed end, said second tubular element being telescopically received by said first open end of said first tubular element, said spring means being disposed within said first and second tubular elements and bearing on said first and second closed ends.

10. The actuating device according to claim 8, wherein said telescopically related elements form spring retaining apparatus which comprises a first tubular element having a first open end and a first closed end and including a first flange at said first closed end, and a second tubular element having a second open end and a second closed end and including a second flange at said second open end, said second closed end being telescopically received by said first open end, said spring means being disposed circumferentially about said first and second tubular elements and bearing on said first and second flanges.

11. The actuating device according to claim 10, wherein said second closed ends has a bore therethrough and said spring retaining apparatus further comprises an elongate rod extending through the bore of said second closed end in slidable relation thereto, said elongate rod including a first end secured to said first closed end and a second end including stop means thereon to prevent withdrawal of said second tubular element from said first tubular element.

12. The actuating device according to claim 10, wherein each of said flanges include grooves formed therein for locating said spring means.

13. The actuating device according to claim 1, wherein said housing includes
a cylindrical opening disposed transversely thereof, and wherein said output means comprises
an output shaft having a rectangular cross-section and extending through the opening transversely of said housing,
bearing means including at least one cylindrical bearing having a rectangular opening extending axially therethrough to receive said output shaft for rotatably mounting said output shaft in the cylindrical opening of said housing, and
means coupled between said rod and said output shaft for translating longitudinal movements of said rod into rotational movements of said output shaft.

14. An actuating device comprising:
a housing including means defining a plurality of chambers,
first and second ones of said chambers being cylindrical, fluid pressure tight and axially aligned,
a third of said chambers being disposed between said first and second chambers;
first and second pistons respectively slidably disposed in said first and second chambers;
a piston rod extending through said third chamber and into said first and second chambers with its longitudinal axis aligned with the axes of said first and second chambers and connected to said first and second pistons for mutual movement therewith;
means for providing fluid under pressure to each end of said first and second chambers for moving said pistons including first and second fluid inlets, formed in the walls of said housing adjacent said third chamber,
a first plurality of fluid passageways formed in the walls of said housing and extending between said first inlet and one end of each of said first and second chambers, and
a second plurality of fluid passageways formed in the walls of said housing and extending between said second inlet and the other ends of said first and second chambers;
an output shaft extending transversely of said housing and rotably mounted in said third chamber;
means in said third chamber coupled between said piston rod and said output shaft for translating the longitudinal movement of said piston rod into rotational movement of said output shaft; and
a plurality of guide rails disposed within and extending substantially the length of said third chamber for supporting said piston rod over a length that is substantially the maximum distance of rod travel.

References Cited

UNITED STATES PATENTS

| | | | |
|---|---|---|---|
| 632,010 | 8/1899 | Gamble | 92—65 X |
| 1,181,110 | 5/1916 | Carter | 92—65 X |
| 1,181,111 | 5/1916 | Carter | 92—65 X |
| 1,874,130 | 8/1932 | Smickle | 92—65 X |
| 3,199,416 | 8/1965 | Robson | 92—138 X |
| 3,452,961 | 7/1969 | Forsman | 251—58 X |
| 1,685,697 | 9/1928 | Guerin | 92—132 X |
| 2,198,196 | 4/1940 | Goldup | 92—166 X |
| 2,247,827 | 7/1941 | Wegmann | 92—61 X |
| 2,356,899 | 8/1944 | Stutter | 92—168 X |
| 2,366,121 | 12/1944 | Martin-Hurst | 92—130 X |
| 2,471,387 | 5/1949 | Cooper | 92—63 X |
| 2,630,132 | 3/1953 | Hughes | 92—99 |
| 2,722,402 | 11/1955 | Crookston | 92—62 |
| 3,128,751 | 4/1964 | Dahl et al. | 92—138 X |
| 3,424,065 | 1/1969 | Kurt et al. | 308—4 X |

MARTIN P. SCHWADRON, Primary Examiner

A. M. OSTRAGER, Assistant Examiner

U.S. Cl. X.R.

92—132